(12) United States Patent
Yi et al.

(10) Patent No.: US 12,406,501 B2
(45) Date of Patent: Sep. 2, 2025

(54) MONITORING AND EMERGENCY CONTROL SYSTEM FOR VECTOR PSYLLID OF CITRUS HUANGLONGBING

(71) Applicant: Gannan Normal University, Ganzhou (CN)

(72) Inventors: Long Yi, Ganzhou (CN); Xingquan Wang, Ganzhou (CN); Jun Zhou, Ganzhou (CN); Aijun Huang, Ganzhou (CN); Wei Hu, Ganzhou (CN)

(73) Assignee: Gannan Normal University, Ganzhou (CN)

( * ) Notice: Subject to any disclaimer, the term of this patent is extended or adjusted under 35 U.S.C. 154(b) by 123 days.

(21) Appl. No.: 18/420,374

(22) Filed: Jan. 23, 2024

(65) Prior Publication Data
US 2024/0404286 A1    Dec. 5, 2024

(30) Foreign Application Priority Data
May 30, 2023    (CN) .......................... 202310624126.5

(51) Int. Cl.
| | | |
|---|---|---|
| *G06V 20/50* | (2022.01) | |
| *A01M 7/00* | (2006.01) | |
| *G05D 1/225* | (2024.01) | |
| *G05D 1/617* | (2024.01) | |
| *G05D 1/656* | (2024.01) | |

(Continued)

(52) U.S. Cl.
CPC ........... *G06V 20/50* (2022.01); *A01M 7/0089* (2013.01); *G05D 1/225* (2024.01); *G05D 1/617* (2024.01); *G05D 1/665* (2024.01); *G06V 10/774* (2022.01); *G06V 20/188* (2022.01); *G06V 20/41* (2022.01); *H04N 7/181* (2013.01); *G05D 2107/21* (2024.01); *G05D 2109/254* (2024.01)

(58) Field of Classification Search
CPC ...... G06V 20/50; G06V 20/41; G06V 20/188; G06V 10/774; G05D 1/665; G05D 1/225; G05D 1/617; A01M 7/0089; H04N 7/181
See application file for complete search history.

(56) References Cited

U.S. PATENT DOCUMENTS

| | | | |
|---|---|---|---|
| 11,147,257 B2 * | 10/2021 | Warren, Jr. ............ | G05D 1/101 |
| 2003/0130767 A1 * | 7/2003 | Carroll .................. | G01C 11/00 |
| | | | 342/357.31 |

(Continued)

*Primary Examiner* — Ramsey Refai
(74) *Attorney, Agent, or Firm* — Patterson + Sheridan, LLP

(57) ABSTRACT

A monitoring and emergency control system for vector psyllid of citrus huanglongbing (HLB) is disclosed. The system includes a video acquisition module, an image recognition module, a control console, an early warning module and an unmanned aerial vehicle (UAV)-based flight prevention module. The video acquisition module acquires images by using 360-degree dead-angle-free cameras, the cameras are arranged at a plurality of points at a periphery and interior of an orchard, and each camera is numbered. The video acquisition module acquires real-time images, and transmits the real-time images to the image recognition module in real time for recognition and determination. The control console determines whether to send out warning information to an orchard manager and a flight prevention instruction according to a feedback result. The UAV-based flight prevention module receives the instruction, and then carries a pesticide box to take off to a region to kill the psyllid by applying pesticides.

17 Claims, 2 Drawing Sheets

(51) Int. Cl.
    *G06V 10/774*    (2022.01)
    *G06V 20/10*    (2022.01)
    *G06V 20/40*    (2022.01)
    *H04N 7/18*    (2006.01)
    *G05D 107/20*    (2024.01)
    *G05D 109/25*    (2024.01)

(56) References Cited

U.S. PATENT DOCUMENTS

2019/0050948 A1\* 2/2019 Perry .................... G06Q 30/02
2020/0113166 A1\* 4/2020 Warren, Jr. ............ B64D 47/08

\* cited by examiner

MONITORING AND EMERGENCY CONTROL SYSTEM FOR VECTOR PSYLLID OF CITRUS HUANGLONGBING

CROSS REFERENCE TO RELATED APPLICATION

This patent application claims the benefit and priority of Chinese Patent Application No. 202310624126.5, filed with the China National Intellectual Property Administration on May 30, 2023, the disclosure of which is incorporated by reference herein in its entirety as part of the present application.

TECHNICAL FIELD

The present disclosure relates to the field of plant protection, and in particular to a monitoring and emergency control system for the insect vector citrus huanglongbing, citrus psyllid.

BACKGROUND

Once citrus huanglongbing (HLB), the most serious disease during citrus planting, breaks out, it will cause massive death of citrus trees, resulting in enormous economic losses to growers. The HLB is widely distributed in main citrus producing regions of Asia, Africa, and Americas, posing a serious threat to citrus industry. Once trees are infected, they can only be removed. As a result, the HLB is commonly known as "cancer" of citrus. In the field, HLB is mainly spread and diffused by citrus psyllid, a type of vector insect, which seriously restricts development of the citrus industry, and even brings devastating damage to the citrus industry. With differences in climate conditions in different regions, the occurrence of the citrus psyllid varies from 6 generations to 14 generations per year. Depending on ages of the citrus psyllid, the citrus psyllid can be divided into eggs, nymphs and adults. The adults have wings and are prone to long-distance migration by windy, resulting in widespread diffusion of the HLB. Considering that the HLB is mainly transmitted by citrus psyllid, in order to further reduce a probability of occurrence of the HLB, it is necessary to strengthen control over the citrus psyllid, so as to achieve mass prevention and control over the citrus psyllid.

At present, a control solution to the citrus psyllid in production is to widely apply pesticides to an entire orchard to control the psyllid population through analysis insect situation on the basis of manual investigation. However, such a solution has the following disadvantages:
(1) delay of insect information and miss of the best extinguish time the psyllid are often caused;
(2) a population of the psyllid expands rapidly and spreads to adjacent citrus planting regions because the psyllid was not extinguished in time, resulting in greater damage;
(3) potential risks of environmental pollution and excessive pesticide residues in fruit are posed because widespread application of the pesticides in the entire orchard has led to a large amount of pesticides used in the orchard.

Because no effective product and method to control the citrus psyllid is available at present, the present disclosure provides a monitoring and emergency control system for vector psyllid of HLB.

SUMMARY

Aiming at the above defects, the technical problem to be solved by the present disclosure is to provide a monitoring and emergency control system for vector psyllid of HLB on the basis of a current increasingly mature artificial intelligence technology. The monitoring and emergency control system intelligently monitors and recognizes the citrus psyllid by utilizing 360-degree cameras combined with an artificial intelligence image recognition technology, achieves early prevention and accurate pesticide application in terms of control the citrus psyllid, thereby accurately monitoring invasion and population spread of the citrus psyllid, and extinguish invasive sporadic psyllid in time to prevent spread of HLB. The system of the present disclosure can intelligently and accurately monitor invasive citrus psyllid, and immediately performs early warning and initiates an unmanned aerial vehicle (UAV) to spray pesticides to kill the invasive citrus psyllid in time, so as to achieve zero occurrence of the citrus psyllid in an orchard and ensure healthy development of citrus industry.

In order to solve the above technical problem, the technical solution used by the present invention is as follows: the present disclosure relates to a monitoring and emergency control system for vector psyllid of HLB. The monitoring and emergency control system includes a video acquisition module, an image recognition module, a control console, an early warning module and a UAV-based flight prevention module, where the video acquisition module acquires real-time images of a periphery and interior of an orchard, and transmits the real-time images to the image recognition module in real time, the image recognition module recognizes and determines the acquired images on the basis of an image recognition training sample set, and feeds back a recognition result to the control console, the control console determines whether to send out early warning information and a flight prevention instruction according to a feedback result, and the UAV-based flight prevention module receives the instruction, then carries a pesticide box to take off to a region, in which the psyllid is found, to kill the psyllid by applying pesticides.

The video acquisition module includes a video input, a computer, a video memory, a video display, a video output and a mouse and keyboard. The video input acquires the images by using 360-degree dead-angle-free cameras and inputs the images to the computer, the cameras are arranged at a plurality of points at the periphery and interior of the orchard, a quantity and spatial distribution of the cameras mounted are determined according to factors such as a field environment of the citrus orchard and a size of a field of view of the camera, and each camera is numbered. The computer is configured to process video data and communicate with devices such as the display and memory, the computer is a desktop computer or a notebook computer, the video memory is configured to store the acquired images, the video memory is a mechanical hard disk or solid-state hard disk having large capacity, the computer is provided with a data transmission interface, such as a universal serial bus (USB) port or a cable interface, the video output transmits obtained image data to the image recognition module by means of the interface of the computer, the video display is connected to the computer and is configured to display acquired video images in real time, and the mouse and keyboard are configured to operate the computer.

The image recognition module recognizes the psyllid from the received images and outputs the recognition result, and the image recognition module includes an input interface, an artificial intelligence chip and an output interface. The artificial intelligence chip is trained on the basis of a large number of psyllid image sample sets before being used, the sample sets are collected in regions of the orchard in advance, the acquired images should include psyllid feature information, the input interface is configured to receive image data transmitted by the video output and input the image data to the artificial intelligence chip, the artificial intelligence chip recognizes the received images on the basis of the image recognition training sample set, skips images under the condition that the recognition result shows that the psyllid is not found, and saves images and records the camera number under the condition that the recognition result shows that the psyllid is found, the output interface is configured to output information such as an invasion signal and a camera number when invasion of the psyllid is found, and the input interface and the output interface each are a USB interface, a serial port or a cable interface.

The control console includes a data input end, a controller, a wireless communication module and an instruction output end, where the data input end is configured to receive information such as an invasion signal and a camera number output by the image recognition module, the controller generates the early warning information and the UAV-based flight prevention instruction by using a single chip microcomputer, the instruction output end sends the early warning information to an orchard manager and the flight prevention instruction to a UAV through the wireless communication module, and the wireless communication module as a communication interface for transmitting the early warning information and commanding instruction interaction is configured to communicate with the orchard manager and the UAV.

The early warning module provides the early warning information sent by an instruction output end after invasion of the psyllid is recognized from the images, and information content is programmed by a single chip microcomputer of a controller.

The UAV-based flight prevention module receives the flight prevention instruction, then carries the pesticide box to take off, arrives at the region, in which the psyllid is found, by means of a positioning system, and opens the pesticide box to kill the psyllid by applying the pesticides, a pesticide application range and pesticide application time are set by a manager in the control console, the UAV-based flight prevention module flies back to a designated region for parking after pesticide application is completed, the pesticide box is configured to contain pesticides killing the psyllid, such as thiamethoxam, and the pesticide box is connected to a shower head for pesticide application.

The system has the advantages of 360-degree real-time monitoring, automatic control, UAV-based flight prevention, etc. Therefore, the present disclosure provides the intelligent, efficient and real-time accurate monitoring and control system for citrus psyllid, which can achieve early prevention and accurate pesticide application on control and treatment of the citrus psyllid, and avoids the defects of a large pesticide dosage, large pollution and a poor effect of conventional control.

DETAILED DESCRIPTION OF THE EMBODIMENTS

The preferred embodiments of the present disclosure will be described in detail below in combination with the accompanying drawings. It should be understood that the preferred embodiments are only intended to illustrate the present disclosure and are not intended to limit the scope of protection of the present disclosure.

Figure 1:
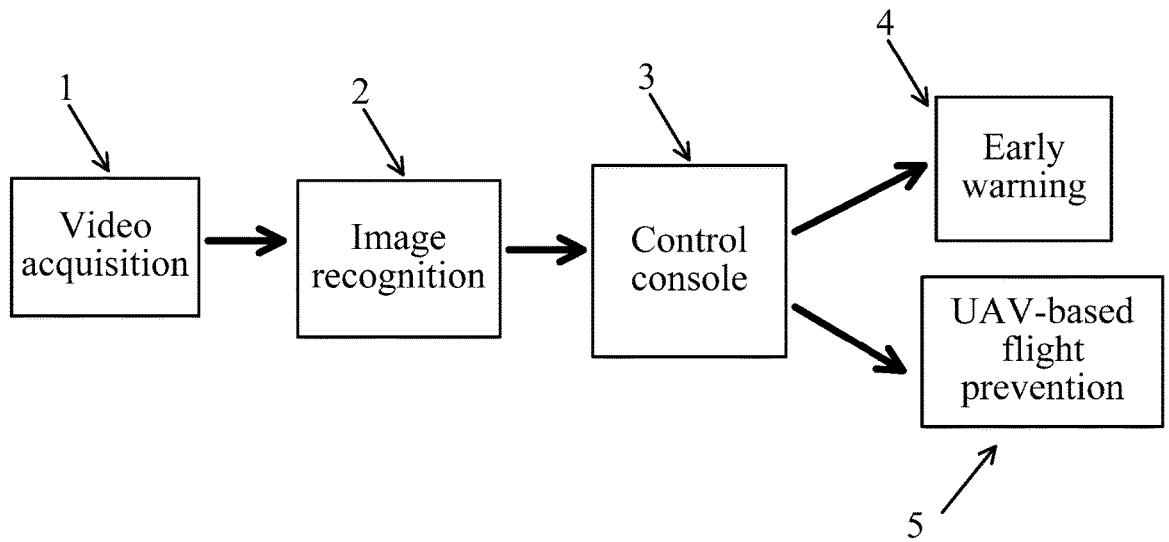
FIG. 1 is a frame diagram of a monitoring and emergency control system for citrus psyllid.
Figure 2:
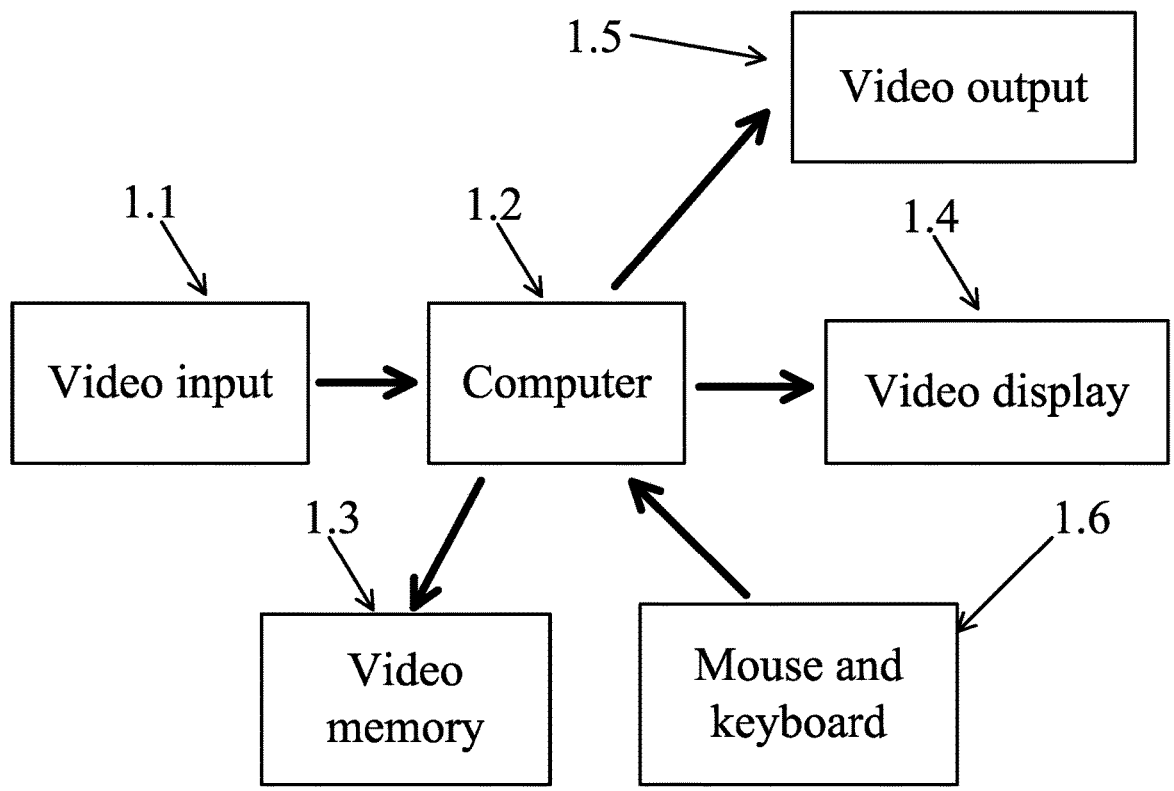
FIG. 2 is a frame diagram of a video acquisition module.
Figure 3:
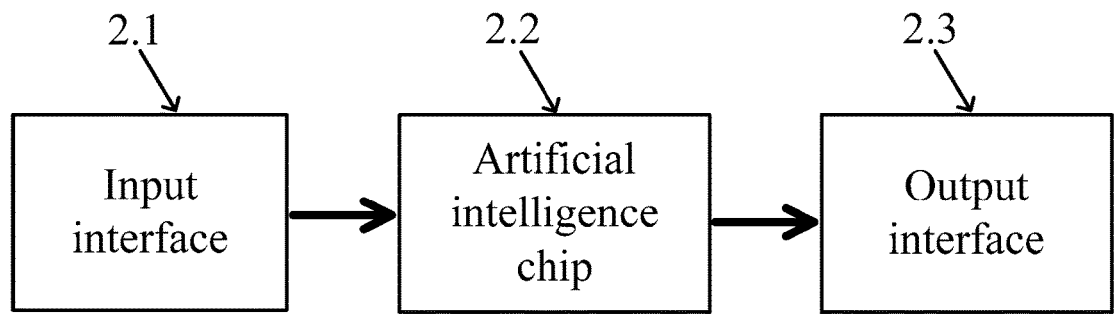
FIG. 3 is a frame diagram of an image recognition module.
Figure 4:
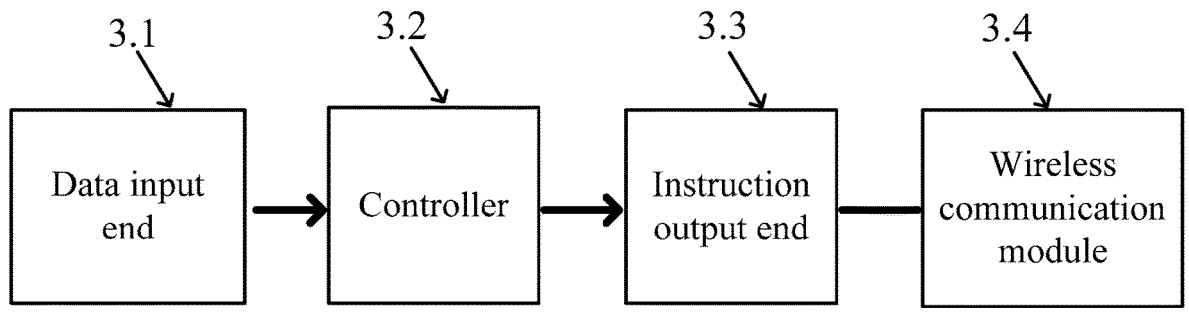
FIG. 4 is a frame diagram of a control console.

As shown in FIG. 1, the present disclosure relates to a monitoring and emergency control system for vector psyllid of HLB. The monitoring and emergency control system includes a video acquisition 1 module, an image recognition 2 module, a control console 3, an early warning 4 module and a UAV-based flight prevention 5 module, where the video acquisition 1 module acquires real-time images of a periphery and interior of an orchard, and transmits the real-time images to the image recognition 2 module in real time, the image recognition 2 module recognizes and determines the acquired images on the basis of an image recognition training sample set, and feeds back a recognition result to the control console 3, the control console 3 determines whether to send out early warning 4 information and a flight prevention instruction according to a feedback result, and the UAV-based flight prevention 5 module receives the instruction, then carries a pesticide box to take off to a region, in which the psyllid is found, to kill the psyllid by applying pesticides.

The video acquisition 1 module includes a video input 1.1, a computer 1.2, a video memory 1.3, a video display 1.4, a video output 1.5 and a mouse and keyboard 1.6. The video input 1.1 acquires the images by using 360-degree dead-angle-free cameras and inputs the images to the computer 1.2, the cameras are arranged at a plurality of points at the periphery and interior of the orchard, a quantity and spatial distribution of the cameras mounted are determined according to factors such as a field environment of the citrus orchard and a size of a field of view of the camera, and each camera is numbered. The computer 1.2 is configured to process video data and communicate with devices such as the display and memory, the computer 1.2 is a desktop computer or a notebook, the video memory 1.3 is configured to store the acquired images, the video memory 1.3 is a mechanical hard disk or solid-state hard disk having large capacity, the computer 1.2 is provided with a data transmission interface, such as a universal serial bus (USB) port or a cable interface, the video output 1.5 transmits obtained image data to the image recognition 2 module by means of the interface of the computer 1.2, the video display 1.4 is connected to the computer 1.2 and is configured to display acquired video images in real time, and the mouse and keyboard 1.6 are configured to operate the computer 1.2.

The image recognition module 2 recognizes the psyllid from the received images and outputs the recognition result, and the image recognition module includes an input interface 2.1, an artificial intelligence chip 2.2 and an output interface 2.3. The artificial intelligence chip 2.2 is trained on the basis of a large number of psyllid image sample sets before being used. The sample sets are collected in regions of the orchard in advance. The acquired images should include psyllid feature information. The input interface 2.1 is configured to receive image data transmitted by the video output 1.5 and input the image data to the artificial intelligence chip 2.2. The artificial intelligence chip 2.2 recognizes the received images on the basis of the image recognition training sample set, skips images under the condition that the recognition result shows that the psyllid is not found, and saves images and records the camera number under the condition that the recognition result shows that the psyllid is found. The output interface 2.3 is configured to output information such as an invasion signal and a camera number when invasion of the psyllid is found. The input interface 2.1 and the output interface 2.3 each are a USB interface, a serial port or a cable interface.

The control console includes a data input end 3.1, a controller 3.2, a wireless communication module 3.3 and an instruction output end 3.4. The data input end 3.1 is configured to receive information such as an invasion signal and a camera number output by the image recognition module 2. The controller 3.2 generates the early warning information and the UAV-based flight prevention instruction by using a singlechip microcomputer. The instruction output end 3.4 sends the early warning information to an orchard manager and the flight prevention instruction to a UAV through the wireless communication module 3.3. The wireless communication module 3.3 as a communication interface for transmitting the early warning information and commanding instruction interaction is configured to communicate with the orchard manager and the UAV.

The early warning 4 module is the early warning information sent by an instruction output end 3.3 after invasion of the psyllid is recognized from the images. Information content is programmed by a singlechip microcomputer of a controller. For example, warning text: "invasion of psyllid is found in a region in which a camera 3 is located, and a UAV has been initiated to the region for flight prevention" is generated.

The UAV-based flight prevention module 5 receives the flight prevention instruction, then carries the pesticide box to take off, arrives at the region, in which the psyllid is found, by means of a positioning system, and opens the pesticide box to kill the psyllid by applying the pesticides. A pesticide application range and pesticide application time are set by a manager in the control console. The UAV-based flight prevention module flies back to a designated region for parking after pesticide application is completed. The pesticide box is configured to contain pesticides killing the psyllid, such as thiamethoxam. The pesticide box is connected to a shower head for pesticide application.

Although the implementations of the present disclosure are described in combination with the accompanying drawings, those skilled in the art can make various modifications and variations without departing from the spirit and scope of the present disclosure. These modifications and variations all fall within the scope defined by the claims.

What is claimed is:

1. A monitoring and emergency control system for citrus psyllid, comprising a video acquisition module, an image recognition module, a control console, an early warning module and an unmanned aerial vehicle (UAV)-based flight prevention module, wherein the video acquisition module acquires real-time images of a periphery and interior of an orchard, and transmits the real-time images to the image recognition module in real time, the image recognition module recognizes and determines the acquired images on the basis of an image recognition training sample set, and feeds back a recognition result to the control console, the control console determines whether to send out early warning information and a flight prevention instruction according to a feedback result, and the UAV-based flight prevention module receives the instruction, then carries a pesticide box to take off to a region, in which the psyllid is found, to kill the psyllid by applying pesticides.

2. The monitoring and emergency control system for citrus psyllid according to claim 1, being applied to emergency control over vector psyllid of huanglongbing (HLB).

3. The monitoring and emergency control system for citrus psyllid according to claim 1, wherein the video acquisition module comprises a video input, a computer, a video memory, a video display, a video output and a mouse and keyboard.

4. The monitoring and emergency control system for citrus psyllid according to claim 1, wherein the image recognition module recognizes the psyllid from the received images and outputs the recognition result, and the image recognition module comprises an input interface, an artificial intelligence chip and an output interface.

5. The monitoring and emergency control system for citrus psyllid according to claim 1, wherein the control console comprises a data input end, a controller, a wireless communication module and an instruction output end, wherein the data input end is configured to receive information comprising an invasion signal and a camera number output by the image recognition module, the controller generates the early warning information and the UAV-based flight prevention instruction by using a single chip microcomputer, the instruction output end sends the early warning information to an orchard manager and the flight prevention instruction to a UAV through the wireless communication module, and the wireless communication module as a communication interface for transmitting the early warning information and commanding instruction interaction is configured to communicate with the orchard manager and the UAV.

6. The monitoring and emergency control system for citrus psyllid according to claim 1, wherein the early warning module provides the early warning information sent by an instruction output end after invasion of the psyllid is recognized from the images, and information content is programmed by a single chip microcomputer of a controller.

7. The monitoring and emergency control system for citrus psyllid according to claim 3, wherein the video input acquires the images by using 360-degree dead-angle-free cameras and inputs the images to the computer, the cameras are arranged at a plurality of points at the periphery and interior of the orchard, a quantity and spatial distribution of the cameras mounted are determined according to factors comprising a field environment of the citrus orchard and a size of a field of view of the camera, and each camera is numbered; and the computer is configured to process video data and communicate with the display and memory, the computer is a desktop computer or a notebook computer, the video memory is configured to store the acquired images, the video memory is a mechanical hard disk or solid-state hard disk having large capacity, the computer is provided with a data transmission interface comprising a universal serial bus (USB) port or a cable interface, the video output transmits obtained image data to the image recognition module by means of the interface of the computer, the video display is connected to the computer and is configured to display acquired video images in real time, and the mouse and keyboard are configured to operate the computer.

8. The monitoring and emergency control system for citrus psyllid according to claim 4, wherein the artificial intelligence chip is trained on the basis of a large number of psyllid image sample sets before being used, the sample sets are collected in regions of the orchard in advance, the acquired images comprise psyllid feature information, the input interface is configured to receive image data transmitted by the video output and input the image data to the artificial intelligence chip, the artificial intelligence chip recognizes the received images on the basis of the image recognition training sample set, skips images under the condition that the recognition result shows that the psyllid is not found, and saves images and records the camera number under the condition that the recognition result shows that the psyllid is found, the output interface is configured to output information comprising an invasion signal and a camera number when invasion of the psyllid is found, and the input interface and the output interface each are a USB interface, a serial port or a cable interface.

9. The monitoring and emergency control system for citrus psyllid according to claim 1, wherein the UAV-based flight prevention module receives the flight prevention instruction, then carries the pesticide box to take off, arrives at the region, in which the psyllid is found, by means of a positioning system, and opens the pesticide box to kill the psyllid by applying the pesticides, a pesticide application range and pesticide application time are set by a manager in the control console, the UAV-based flight prevention module flies back to a designated region for parking after pesticide application is completed, the pesticide box is configured to contain pesticides killing the psyllid, comprising thiamethoxam, and the pesticide box is connected to a shower head for pesticide application.

10. A monitoring and emergency control method for citrus psyllid using the monitoring and emergency control system for citrus psyllid according to claim 1, wherein during operation, the video acquisition module acquires real-time images of a periphery and interior of an orchard, and transmits the real-time images to the image recognition module, the image recognition module recognizes and determines the acquired images on the basis of an image recognition training sample set, skips images under the condition that a recognition result shows that the psyllid is not found, and saves images and records information comprising a camera number under the condition that the recognition result shows that the psyllid is found, and the output interface for image recognition feeds back information comprising an invasion signal and the camera number to the control console, the control console determines whether to send out early warning information to an orchard manager and a flight prevention instruction according to a feedback result, and the UAV-based flight prevention module receives the instruction, and then carries a pesticide box to take off to a region, in which the psyllid is found, to kill the psyllid by applying pesticides.

11. The monitoring and emergency control method according to claim 10, being applied to emergency control over vector psyllid of huanglongbing (HLB).

12. The monitoring and emergency control method according to claim 10, wherein the video acquisition module comprises a video input, a computer, a video memory, a video display, a video output and a mouse and keyboard.

13. The monitoring and emergency control method according to claim 10, wherein the image recognition module recognizes the psyllid from the received images and outputs the recognition result, and the image recognition module comprises an input interface, an artificial intelligence chip and an output interface.

14. The monitoring and emergency control method according to claim 10, wherein the control console comprises a data input end, a controller, a wireless communication module and an instruction output end, wherein the data input end is configured to receive information comprising an invasion signal and a camera number output by the image recognition module, the controller generates the early warning information and the UAV-based flight prevention instruction by using a single chip microcomputer, the instruction output end sends the early warning information to an orchard manager and the flight prevention instruction to a UAV through the wireless communication module, and the wireless communication module as a communication interface for transmitting the early warning information and commanding instruction interaction is configured to communicate with the orchard manager and the UAV.

15. The monitoring and emergency control method according to claim 10, wherein the early warning module provides the early warning information sent by an instruction output end after invasion of the psyllid is recognized from the images, and information content is programmed by a single chip microcomputer of a controller.

16. The monitoring and emergency control method according to claim 12, wherein the video input acquires the images by using 360-degree dead-angle-free cameras and inputs the images to the computer, the cameras are arranged at a plurality of points at the periphery and interior of the orchard, a quantity and spatial distribution of the cameras mounted are determined according to factors comprising a field environment of the citrus orchard and a size of a field of view of the camera, and each camera is numbered; and the computer is configured to process video data and communicate with the display and memory, the computer is a desktop computer or a notebook computer, the video memory is configured to store the acquired images, the video memory is a mechanical hard disk or solid-state hard disk having large capacity, the computer is provided with a data transmission interface comprising a universal serial bus (USB) port or a cable interface, the video output transmits obtained image data to the image recognition module by means of the interface of the computer, the video display is connected to the computer and is configured to display acquired video images in real time, and the mouse and keyboard are configured to operate the computer.

17. The monitoring and emergency control method according to claim 13, wherein the artificial intelligence chip is trained on the basis of a large number of psyllid image sample sets before being used, the sample sets are collected in regions of the orchard in advance, the acquired images comprise psyllid feature information, the input interface is configured to receive image data transmitted by the video output and input the image data to the artificial intelligence chip, the artificial intelligence chip recognizes the received images on the basis of the image recognition training sample set, skips images under the condition that the recognition result shows that the psyllid is not found, and saves images and records the camera number under the condition that the recognition result shows that the psyllid is found, the output interface is configured to output information comprising an invasion signal and a camera number when invasion of the psyllid is found, and the input interface and the output interface each are a USB interface, a serial port or a cable interface.

* * * * *